United States Patent [19]
Good et al.

[11] Patent Number: 5,508,601
[45] Date of Patent: Apr. 16, 1996

[54] PROTECTION SYSTEM FOR A SHORTED RECTIFYING DIODE WITHIN A SYNCHRONOUS GENERATOR

[75] Inventors: Jef W. Good, Beloit, Wis.; David J. Mrowiec, Rockford, Ill.

[73] Assignee: Sundstrand Corporation, Rockford, Ill.

[21] Appl. No.: 339,864

[22] Filed: Nov. 15, 1994

[51] Int. Cl.$^6$ .................................................... H02P 9/00
[52] U.S. Cl. ............................... 322/37; 322/59; 322/69; 361/20
[58] Field of Search ................................. 322/17, 68, 69, 322/99, 100, DIG. 2, 58, 59

[56] References Cited

U.S. PATENT DOCUMENTS

| | | | |
|---|---|---|---|
| 4,442,396 | 5/1984 | Hucker | 332/21 |
| 4,486,801 | 12/1984 | Jackovich et al. | 361/21 |
| 4,528,493 | 7/1985 | Spencer et al. | 322/99 |
| 4,559,486 | 12/1985 | Spencer et al. | 322/99 |
| 4,595,965 | 6/1986 | Glennon | 361/20 |
| 4,710,840 | 12/1987 | Shepler et al. | 361/20 |

*Primary Examiner*—Steven L. Stephan
*Assistant Examiner*—Nicholas Ponomarenko
*Attorney, Agent, or Firm*—Jeffery J. Makeever

[57] ABSTRACT

A shorted rectififing diode protection system for a synchronous generator having a stationary exciter field which induces a voltage in a rotating exciter armature when energized by an exciter drive current, the voltage being rectified by a plurality of rotating rectifiers and applied to a rotating field winding to induce an output voltage in a plurality of main stator output phase windings, the output voltage being controlled by a voltage regulator having peak excitation current protection means, comprises a circuit for detecting actuation of the excitation current protection and generating a field protection monitor signal, a circuit for discriminating a shorted exciter field and generating a protection lock-out signal, and a logic circuit responsive to the field protection monitor signal and the protection lock-out signal for generating a shorted rectifying diode protection signal. Upon generation of the protection signal, the system disables the voltage regulator to preclude collateral damage to the generator. The method of detecting a shorted exciter field rectifying diode comprises the steps of a) monitoring the peak current supplied to the exciter field from the voltage regulator, b) generating a field protection monitor signal when the peak current exceeds a given threshold, c) generating a protection lock-out signal if the exciter field is discriminated as shorted, d) de-energizing the generator in response to the field protection monitor signal, and e) inhibiting the step of de-energizing the generator in response to the protection lock-out signal.

18 Claims, 5 Drawing Sheets

PROTECTION SYSTEM FOR A SHORTED RECTIFYING DIODE WITHIN A SYNCHRONOUS GENERATOR

FIELD OF THE INVENTION

The instant invention relates to protection systems for electric power generating systems, and more particularly to a system of protection which isolates a shorted exciter field rectifying diode within a synchronous generator, precluding collateral damage thereto.

BACKGROUND ART

Continuing developments in the aerospace industry are allowing many products to become smaller, lighter weight, and operate at much higher speeds and power densities than have be heretofore known. One such product enjoying continued advancement is an electric generator manufactured by the assignee of the instant invention. This advanced generator 100 is a high power, light weight, synchronous two-pole, 24,000 rpm machine whose assembly comprises a main generator 102, a permanent magnet generator 104, an exciter generator 106, and a rotating rectifier assembly 108 as shown in FIG. 1. As the generator is driven by a prime mover, such as an aircraft engine, through a constant speed hydromechanical drive, the permanent magnet generator (PMG) 104 produces a sinusoidal electric output which supplies power to the generator controller 110. The controller 110 rectifies this sinusoidal output to drive the exciter field 112 via a voltage regulator circuit as is known in the art, for example as described in U.S. Pat. Nos. 4,044,296; 4,152,172; 4,245,183; 4,262,242; 4,446,417; 4,477,765; 4,567,422; 4,933,623; or 5,285,147. As the exciter field 112 is energized, it induces a voltage in the rotating armature windings 118 of the exciter generator 106. This poly-phase voltage is then rectified by the rotating rectifier assembly 108 to energize the main rotating field winding 114, which in turn induces an output voltage in the main generator's poly-phase stator windings 120. The level of excitation is varied to regulate this output voltage which is then coupled to the aircraft system electrical loads by the distribution feeders.

The output voltage regulation is typically accomplished by modulating a current signal to the exciter field 112. As a greater system load is connected to the distribution feeders, the duty cycle of the modulation is increased to allow increased excitation to maintain the output voltage at a constant level. If, however, one of the rotating rectifying diodes of the rectifier assembly, e.g. diode 116, were to become shorted, a half cycle phase-to-phase short circuit of the rotating exciter armature windings 118 would occur whenever diodes 122 or 124 are forward biased. A result of this fault is a depressed output voltage because less power actually flows through the main exciter field 114 due to the half cycle phase-to-phase short circuit. In response to the lower output voltage, however, the controller 110 increases the duty cycle of the exciter field drive circuit to increase the level of excitation to the generator 100, and thereby the output voltage. Depending on the system loading of the generator 100, the output voltage may recover to its nominal level, but with a greatly increased exciter current. FIG. 2 illustrates the average exciter field current versus generator load for a normal condition, trace 126, and a shorted rotating diode condition, trace 128. As may be seen from this figure, greatly increased exciter field current is required to maintain output voltage at any given load during the fault condition.

To guard against such faults, a system of protection as illustrated in FIG. 3 is typically employed by the controller 110. This protection monitors each phase of the generator output current $I_{\Phi A}$, $I_{\Phi B}$, $I_{101\ C}$, and determines the average generator load current $I_L$ via block 130. The load current $I_L$ is then input to a function block 132 which calculates the expected maximum exciter field current $I_{EXC(CALCULATED)}$ for the given generator load current $I_L$ (see FIG. 2, trace 126). A logic block 134 then compares this calculated exciter field current to the actual monitored average exciter field current $I_{EXC(ACTUAL)}$. If the actual average exciter field current exceeds the calculated value based on actual load current ($I_{EXC(ACTUAL)} > I_{EXC(CALCULATED)}$) for a given period of time 136, the controller 110 will de-energize the generator to isolate the fault.

If the shorted diode fault exists upon initial excitation of the generator, however, the normal shorted rotating diode protection may not be capable of sensing the fault due to action of protection circuitry associated with the exciter field driver circuit itself. Prior to initial excitation of the generator, the output voltage is approximately zero volts. Since the typical output voltage regulation circuit is a closed loop system as described above and known in the art, the zero volt feedback upon initial excitation will result in maximum duty cycle of the exciter field driver circuit. Normally, the output voltage of the generator quickly builds, the duty cycle is reduced, and the output voltage achieves and maintains its nominal value. For the condition where the shorted rotating diode exists at initial excitation, however, the peak current flowing is not reduced as with the non-faulted condition due to the half cycle phase-to-phase short circuit of the exciter armature. As the exciter current continues to build, a peak current protection circuit shuts off the exciter driver to protect the circuit from high current stress damage. Since the peak current protection circuit is only concerned with protecting the driver from current "spikes" which exceed its stress rating, it re-enables the driver after a short time, typically within less than a second, to allow continued operation after the transient has passed. If the condition causing the high current is still present, such as in the present case of a shorted rotating diode, the protection will once again turn off the exciter driver once the high current level has been reached, typically in less than 1 millisecond. As a result of this interplay between the latent diode fault and the driver peak current protection, the standard shorted rotating diode protection cannot detect the presence of the fault because the actual average exciter field current does not exceed the calculated exciter field current for longer than the time delay. Standard under voltage protection also does not isolate the fault because the excitation which is provided to the exciter field prior to actuation of the peak current protection circuit is sufficient to induce a generator output voltage which exceeds the under voltage trip limit. Once the peak current protection circuit turns off the exciter driver, the exciter current decays through a flyback diode within the controller. This continued exciter current flow maintains the generator output voltage above the under voltage trip limit for the period until the peak current protection is reset. Once the exciter is re-enabled, the current pulse boosts the generator output voltage once again until the cycle is repeated. The exciter driver continually tries to excite the generator each time its current protection is reset, which results eventually in collateral damage to the generator without indication of the cause of the problem.

Efforts to correct this problem have included oversizing the exciter driver circuit to handle the larger peak currents generated during the initial excitation of the generator during a shorted rotating diode fault condition. Although this technically solves the problem, the use of larger than required drivers prohibitively increases the cost of the controller. Also, the frequency of this type of fault cannot justify the use of the larger, more expensive elements which would be required. Disabling the peak current protection for the driver is likewise not a workable solution due to the damage which may be incurred by the switching elements from such high current spikes.

The instant invention is directed at overcoming these problems without increasing the cost or complexity of the generator controller, nor without disabling the inherent functionality or protections of the standard voltage regulation circuitry known and used within the art for synchronous generator output voltage regulation.

SUMMARY OF THE INVENTION

It is the principle objective of the instant invention to provide a new and improved system of protection for detecting and isolating shorted exciter rectifying diodes within an electric machine. More particularly, it is the principle objective of the instant invention to provide a shored rectifying diode protection system which monitors the exciter field peak current protection circuit and the output generator voltage to sense the presence of the shorted rectifying diode.

In a preferred embodiment of the instant invention, a shorted rectifying diode protection system for a synchronous generator having a stationary exciter field which induces a voltage in a rotating exciter armature when energized by an exciter drive current, the voltage being rectified by a plurality of rotating rectifiers and applied to a rotating field winding to induce an output voltage in a plurality of main stator output phase windings, the output voltage being controlled by a voltage regulator having peak excitation current protection means, comprises a circuit for detecting actuation of the excitation current protection and for generating a field protection monitor signal, a circuit for discriminating a shorted exciter field and for generating a protection lock-out signal, and a logic circuit responsive to the field protection monitor signal and the protection lock-out signal for generating a shorted rectifying diode protection signal. Upon generation of the protection signal, the system disables the voltage regulator to preclude collateral damage to the generator.

In a highly preferred embodiment of the instant invention, a circuit to protect against shorted exciter field rectifying diodes in an electric machine wherein its exciter field is energized by a voltage regulator which controls the current to the exciter field, comprises a circuit for monitoring the peak current supplied by the voltage regulator to the exciter field. This monitoring circuit generates a field protection monitor signal if the monitored peak current exceeds a given current threshold. Further, a circuit for discriminating a shorted exciter field by monitoring the output voltage of the machine generates a protection lock-out signal when the output voltage droops below a given voltage threshold, if the field protection monitor signal is generated. This embodiment further comprises a logic circuit responsive to the field protection monitor signal for generating a shorted rectifying diode protection signal to disable the voltage regulator, which, in turn, de-energizes the generator. The logic circuit is inhibited from generating the shorted rectifying diode protection signal, however, in response to the protection lock-out signal generated by the discriminating circuit.

A preferred method of detecting a shorted exciter field rectifying diode comprises the steps of a) monitoring the peak current supplied to the exciter field from the voltage regulator, b) generating a field protection monitor signal when the peak current exceeds a given threshold, c) monitoring the generator output voltage, d) generating a protection lock-out signal when the output voltage is below a given voltage threshold if the field protection monitor signal is generated, e) de-energizing the generator in response to the field protection monitor signal, and f) inhibiting the step of de-energizing the generator in response to the protection lock-out signal.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
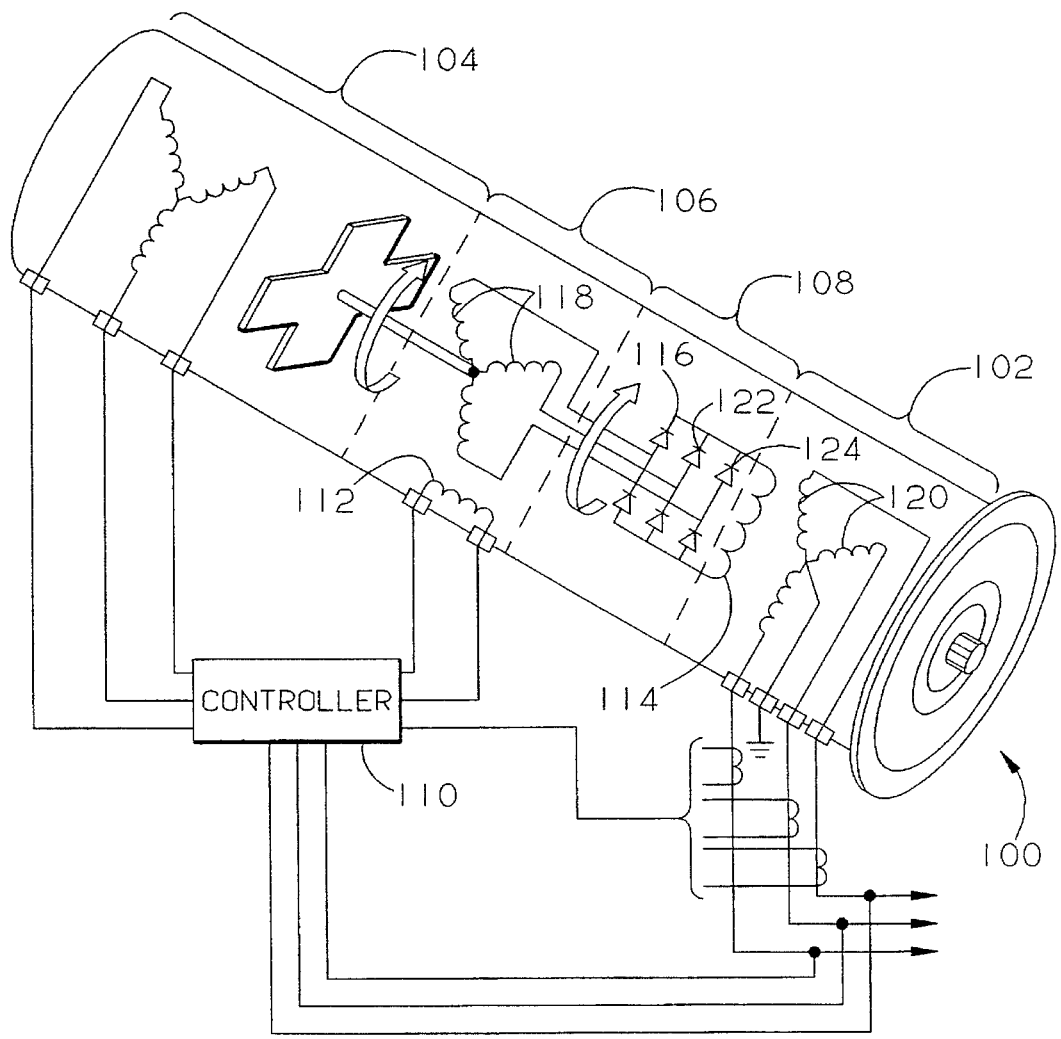
FIG. 1 is a single line schematic diagram of a synchronous electric machine illustrative of aspects of the instant invention.
Figure 2:
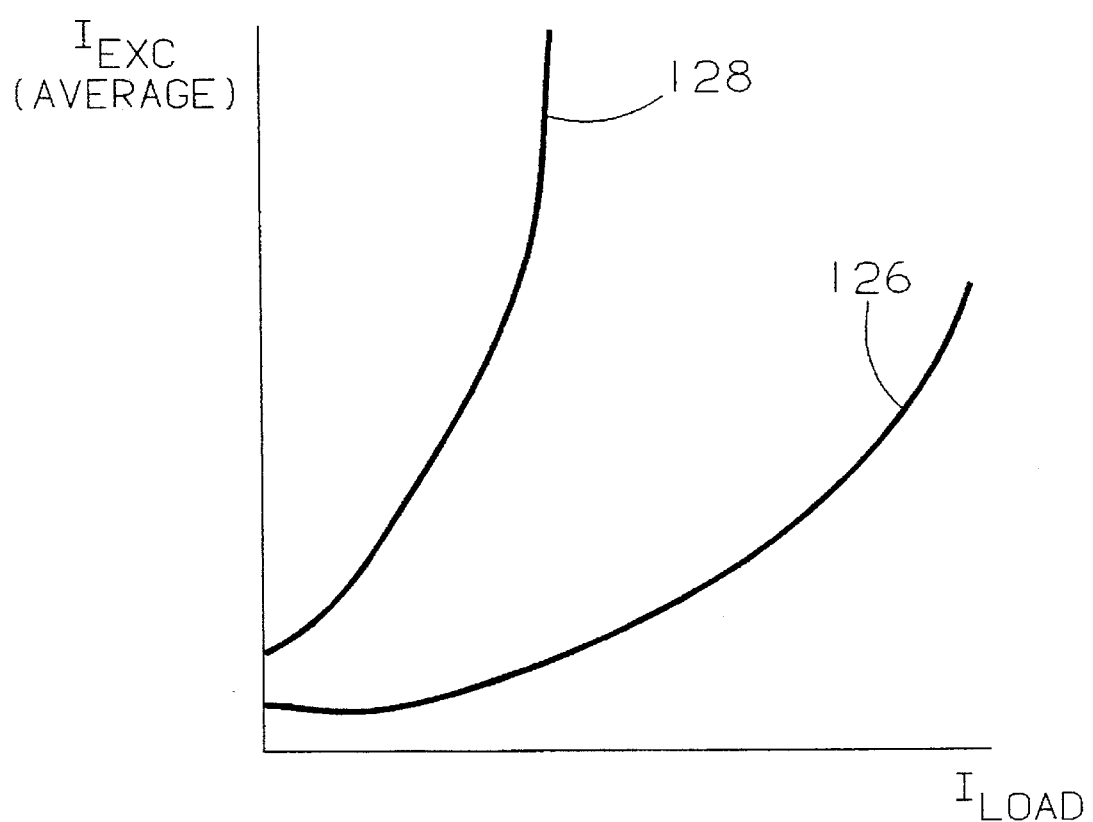
FIG. 2 is a graphical illustration of average exciter field current during faulted and non-faulted operation of the machine of FIG. 1.
Figure 3:
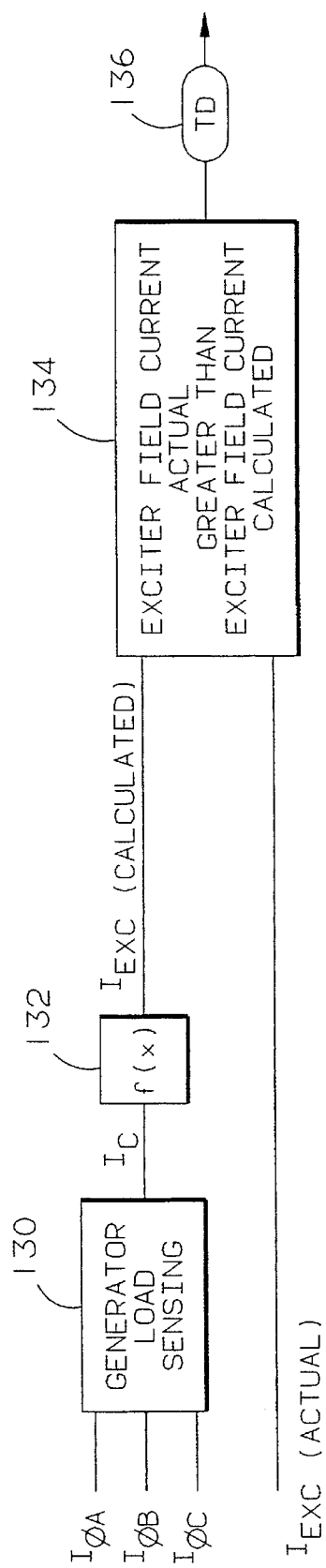
FIG. 3 is a block diagrammatic illustration of a prior art protection circuit.
Figure 4:
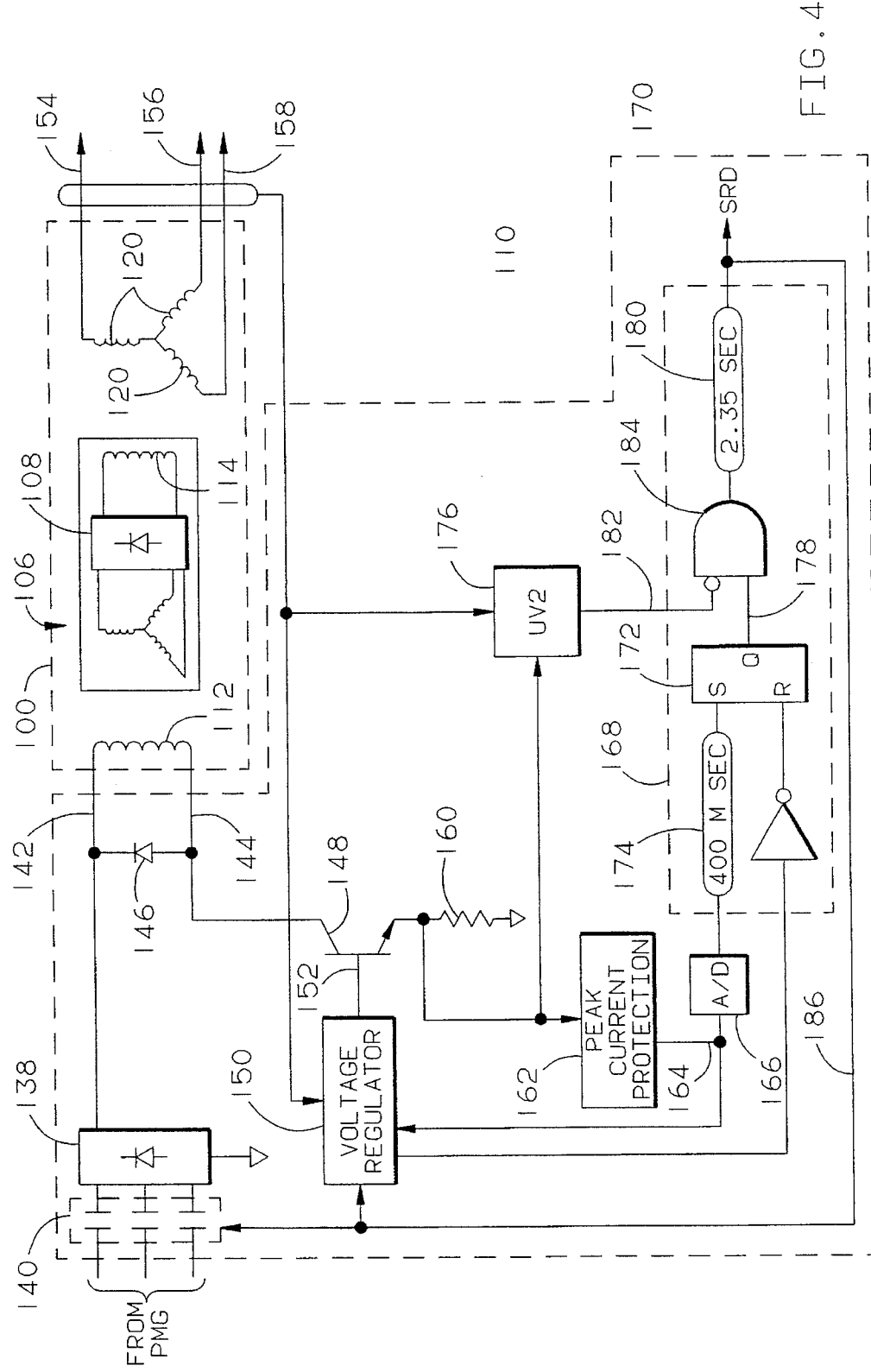
FIG. 4 is a single line block diagram illustrating a preferred embodiment of the instant invention.

In a preferred embodiment of the instant invention, as illustrated in FIG. 4, a full wave bridge rectifier 138 rectifies the poly-phase ac voltage generated by the PMG 104 (see FIG. 1). A generator control relay (GCR) 140 is interposed between the rectifier 138 and the PMG to provide isolation when the generator 100 is to be de-energized. The rectified voltage is coupled by lines 142 and 144 to the exciter field 112. An exciter field fly-back diode 146 is provided across lines 142 and 144 to provide a current path as the field current decays once the exciter field control switch 148 is turned off. When this switch is commanded on by the voltage regulator 150 via the base drive line 152, current flows through the exciter field 112 which induces a voltage in the rotating exciter armature 106 which, in turn, is rectified by the rotating rectifiers 108 and applied to the rotating field winding 114. The resulting rotating field induces an ac voltage in the main stator windings 120 which is then coupled to various electrical loads via feeders 154, 156, 158.

This output voltage and the current supplied to the loads are monitored by the voltage regulator 150 which then adjusts the pulse width modulation of switch 148 to maintain the output voltage at a given level. Means, in the form of a peak excitation current protection circuit 162, are provided in the preferred embodiment to monitor the exciter field current which flows when the switch 148 is on. As illustrated, the peak current protection circuit 162 utilizes a resistor 160 which transforms the current signals into voltage signals for ease of peak hold and measurement, although other means such as Hall effect devices or current transformers may be employed as appropriate.

The peak current protection circuit 162 generates a field protection monitor signal on line 164 when the peak current flowing through switch 148 is greater than a given current threshold. This threshold can be set based on physical switch parameters or based on known operating conditions of the generator 100. When this field protection monitor signal is generated, the voltage regulator 150 disables (turns off) switch 148 for a short period of time. After this period, the voltage regulator 150 may again control the switch 148. If, however, a high current is again sensed by the peak current protection circuit 162, it will again generate the field protection monitor signal to again disable the switch 148 for a short period. Absent the protection system of the instant invention, this cycle will continue if the high current causing fault, e.g. a shorted rotating rectifying diode, is still present each time the switch 148 is re-enabled by the voltage regulator 150. Although the acceptable time for this period of disablement may vary based on the particular application, a period of less than one second is preferred. Specifically, a period of approximately 750 milliseconds is preferred.

In this preferred embodiment of the instant invention, a means such as an analog-to-digital circuit 166 detects the actuation of the peak excitation current protection circuit 162. This circuit 166 generates a field protection monitor signal which can be used by logic means 168 for generating a shorted rectifying diode protection signal on line 170 to disable the voltage regulator 150. For systems which also utilize a generator control relay (GCR) 140 to provide physical isolation between the PMG and the exciter field 112, the GCR may also be tripped by this signal. As will also be recognized by one skilled in the art, the analog-to-digital circuit may be any type of interface circuitry appropriate to circuit topology of the specific implementation of the logic means 168. As illustrated, the logic means 168 is of a digital topology and, therefore, an analog-to-digital interface 166 is required. However, if the logic means were implemented in an analog topology, the means for detecting actuation of the peak excitation current protection circuit 162 may consist of nothing more than a wire coupled to a high input impedance sensing circuit or other appropriate circuitry as will be obvious to one skilled in the art from the foregoing description.

The logic means 168 comprises a latch 172 which is set by the field protection monitor signal. Preferably, a time delay 174 is interposed between the interface circuit 166 and the latch 172 to delay the setting of the latch 172 for a fixed duration after generation of the field protection monitor signal on line 164. The duration of this time delay is chosen to coordinate with other system protections which may isolate the high exciter current to another source, such as for example to a shorted exciter field. This other protective function is illustrated by the circuit block 176 and described in co-pending application Ser. No. 08/098,691 which is incorporated herein by reference. In this embodiment a duration of greater than 200 milliseconds is appropriate. Preferably, a duration of approximately 400 milliseconds is chosen. Once the latch 172 has been set, a shorted rectifying diode protection signal is generated on line 178 which is then delayed by a time delay 180 before disabling the voltage regulator 150 and tripping the GCR 140 via line 170. The duration of this time delay 180 is also chosen to coordinate with other system protective functions to assure proper isolation of system faults. In this embodiment of the instant invention, a duration of approximately 2.35 seconds is chosen, although a shorter or longer duration may be chosen as required by the generator's physical construction, i.e. in addition to protective function coordination, time delay duration may be adjusted to preclude collateral damage to generator 100.

The generation of the shorted rectifying diode protection signal may be inhibited by the means 176 for discriminating a shorted exciter field as described above. This circuit 176 generates a protection lockout signal on line 182 which inhibits the AND gate 184 and prevents the time delay 180 from timing out, thus inhibiting the generation of the shorted rectifying diode signal on line 170. As an additional means for preventing inadvertent or erroneous protective signals on line 170, the latch 172 will be reset whenever the voltage regulator is not enabled as indicated by line 186. The voltage regulator 150 may be disabled by a protective function, or when the generating system is shut down normally. The latch 172 is reset priority which ensures that the output 178 will not be set if the voltage regulator 150 is not enabled.

Figure 5:
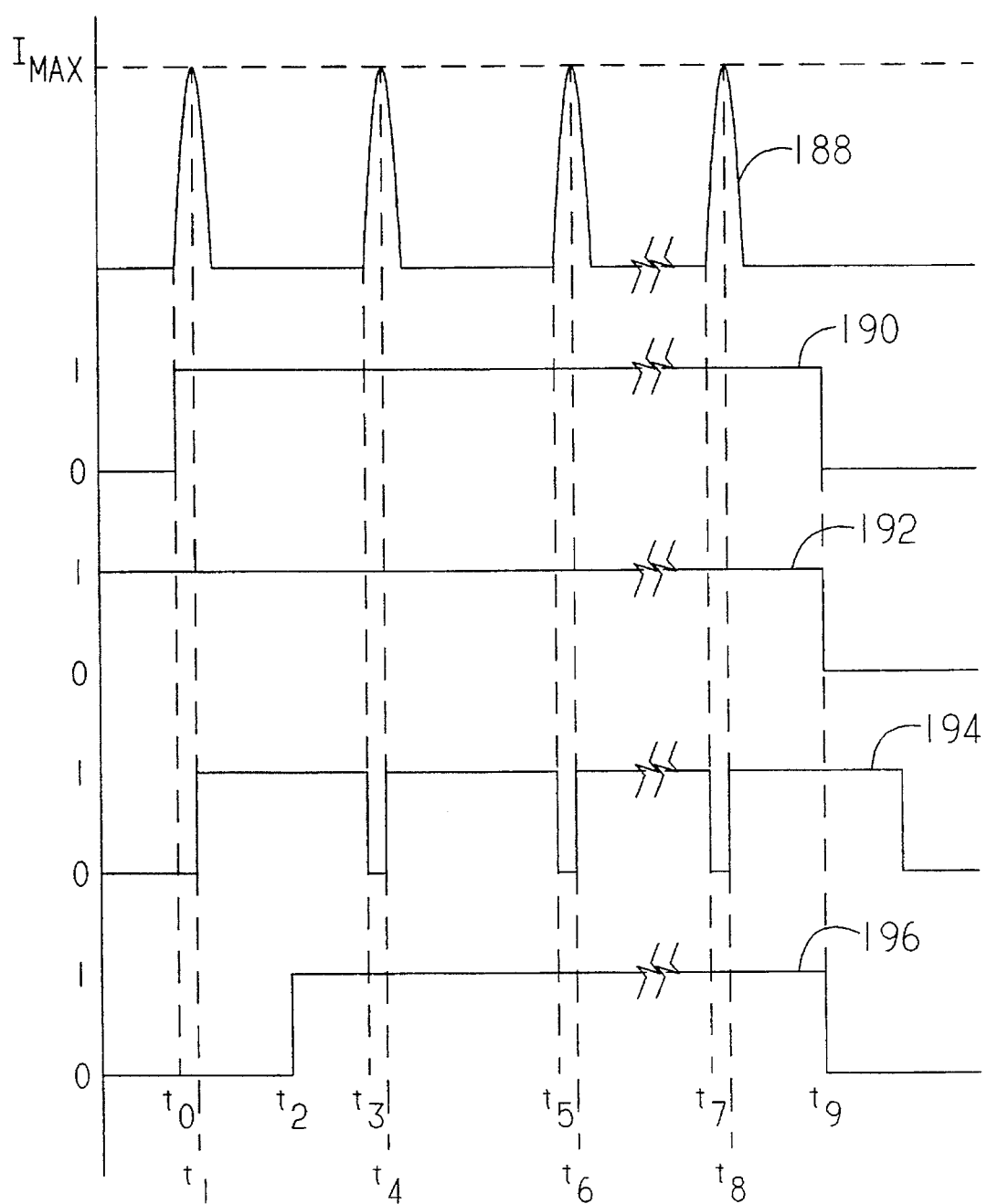
FIG. 5 is a waveform diagram illustrating an operational aspect of the instant invention.

FIG. 5 illustrates the operation of the preferred embodiment during a shorted rectifying diode condition. Waveform 188 illustrates the exciter field current, waveform 190 illustrates the voltage regulator enable signal, waveform 192 illustrates the GCR status, waveform 194 illustrates the field protection monitor signal, and waveform 196 illustrates the shorted rectifying diode protection signal. At time $t_0$ the voltage regulator is enabled 190 and the exciter field current 188 begins to flow. At time $t_1$ the exciter field current exceeds the given current threshold, $I_{max}$ and the field protection monitor signal 194 is generated. At time $t_2$, after the expiration of time delay 174 (see FIG. 4), the latch 172 is set, thereby generating the shorted rectifying diode signal 196. As stated above, the field protection monitor signal 194 is reset after 750 milliseconds, at time $t_3$, to allow the voltage regulator 150 to again attempt excitation of the generator 100. Since the shorted rectifying diode is still present in the generator 100, the exciter current 188 again exceeds the peak current limit at $t_4$, once again triggering the field protection monitor signal 194 which commands the voltage regulator 150 to disable the switch 148. This cycling continues at times $t_5$–$t_6$, and $t_7$–$t_8$, until the time delay 180 expires at time $t_9$. At this point the GCR 140 is tripped and the voltage regulator 150 is disabled. This resets latch 172 and allows further fault isolation if the voltage regulator is re-enabled by the flight crew or by automatic fault reset.

The preferred method of detecting and isolating a shorted exciter field rectifying diode 108 for a synchronous generator 100 wherein the exciter field 112 is excited by a current signal from a voltage regulator 150, comprises the steps of a) monitoring peak current 188 supplied to the exciter field 112 from the voltage regulator 150, b) generating a field protection monitor signal 194 when the peak current 188 exceeds a given threshold $I_{max}$, and c) de-energizing the generator 100 in response to the field protection monitor signal 194. The preferred method additionally comprises the step of latching the field protection monitor signal, and the step of resetting the latching of the field protection monitor signal when the voltage regulator is disabled. In a highly preferred method of the instant invention, the step of de-energizing the generator 100 is delayed for a set period of time. The preferred method further comprises the steps of generating a protection lock-out signal when the exciter field 112 is discriminated as shorted, and inhibiting the step of de-energizing the generator 100 in response to the protection lock-out signal.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A shorted rectifying diode protection system for a synchronous generator having a stationary exciter field which induces a voltage in a rotating exciter armature when energized by an exciter drive current, the voltage being rectified by a plurality of rotating rectifiers and applied to a rotating field winding to induce an output voltage in a plurality of main stator output phase windings, the output voltage being controlled by a voltage regulator having peak excitation current protection means, comprising: means for detecting actuation of the peak excitation current protection means, said detecting means generating a field protection monitor signal in response thereto; and logic means responsive to said field protection monitor signal for generating a shorted rectifying diode protection signal, thereby disabling the voltage regulator.

2. The protection system of claim 1, wherein said logic means comprises a latch which is set by said field protection monitor signal, said shorted rectifying diode protection signal being generated thereby.

3. The protection system of claim 2, wherein said logic means further comprises a first time delay of a first duration interposed between said detecting means and said latch, said first time delay delaying said field protection monitor signal for said first duration prior to setting said latch.

4. The protection system of claim 2, further comprising means for monitoring the operational status of the voltage regulator, said monitoring means generating a voltage regulator enable signal when the voltage regulator is operational and a not (voltage regulator enable) signal when the voltage regulator is disabled, and wherein said latch is reset by said not (voltage regulator enable) signal.

5. The protection system of claim 4, wherein said latch is reset priority.

6. The protection system of claim 2, wherein said logic means comprises a second time delay of a second duration, said shorted rectifying diode protection signal being generated upon expiration of said second duration after said latch has been set.

7. The protection system of claim 2, further comprising means for discriminating a shorted exciter field, said discriminating means generating a protection lock-out signal, and wherein said shorted rectifying diode protection signal is inhibited when said protection lock-out signal is generated.

8. A circuit to protect against shorted exciter field rectifying diodes in a synchronous generator wherein the exciter field is energized by a voltage regulator which controls the current to the exciter field, comprising:

means for monitoring peak current supplied by the voltage regulator to the exciter field, said monitoring means generating a field protection monitor signal if said peak current exceeds a given current threshold; and logic means responsive to said field protection monitor signal for generating a shorted rectifying diode protection signal to disable the voltage regulator, de-energizing the generator thereby.

9. The circuit of claim 8, wherein said logic means comprises a latch which is set by said field protection monitor signal, said shorted rectifying diode protection signal being generated thereby.

10. The circuit of claim 9, further comprising means for monitoring the operational status of the voltage regulator, said status monitoring means generating a voltage regulator enable signal when the voltage regulator is operational and a not (voltage regulator enable) signal when the voltage regulator is disabled, and wherein said latch is reset by said not (voltage regulator enable) signal.

11. The circuit of claim 10, wherein said latch is reset priority.

12. The circuit of claim 9, wherein said logic means comprises a time delay of a predetermined duration, said shorted rectifying diode protection signal being generated upon expiration of said predetermined duration after said latch has been set.

13. The circuit of claim 8, further comprising means for discriminating a shorted exciter field, said discriminating means monitoring output voltage and output current of the generator and exciter field current, said discriminating means generating a protection lock-out signal upon discrimination of a shorted exciter field, and wherein said logic means is inhibited from generating said shorted rectifying diode protection signal in response to said protection lock-out signal.

14. A method of detecting a shorted exciter field rectifying diode for a synchronous generator wherein the exciter field is excited by a current signal from a voltage regulator, comprising the steps of:

monitoring peak current supplied to the exciter field from the voltage regulator;

generating a field protection monitor signal when the peak current exceeds a given threshold; and de-energizing the generator in response to the field protection monitor signal.

15. The method of claim 14, further comprising the step of latching the field protection monitor signal.

16. The method of claim 15, further comprising the step of resetting the latching of the field protection monitor signal when the voltage regulator is disabled.

17. The method of claim 16, further comprising the step of delaying the step of de-energizing the generator for a set period of time.

18. The method of claim 14, further comprising the steps of:

generating a protection lock-out signal when the exciter field is discriminated as shorted; and inhibiting the step of de-energizing the generator in response to the protection lock-out signal.

* * * * *